March 5, 1968  R. E. WEBER  3,372,044
METHOD AND COMPOSITION FOR FORMING PAPER
HAVING OPAQUE CELLULAR STRUCTURE
Filed June 30, 1964

United States Patent Office 3,372,044
Patented Mar. 5, 1968

3,372,044
METHOD AND COMPOSITION FOR FORM-
ING PAPER HAVING OPAQUE CELLULAR
STRUCTURE
Robert E. Weber, Neenah, Wis., assignor to Kimberly-
Clark Corporation, Neenah, Wis., a corporation of
Delaware
Filed June 30, 1964, Ser. No. 379,209
6 Claims. (Cl. 106—130)

ABSTRACT OF THE DISCLOSURE

A coating composition for paper of the oil-in-water type. The continuous phase of the emulsion includes pigment and a starch binder. The disperse phase is an oil having a lower vapor pressure than water. The composition has as the emulsifier a protein. The aqueous phase is substnatially free of protein. The composition includes polyvalent metallic cations which tend to concentrate in and serve as a hardening agent for the protein in the product. The product, that is the composition, when coated on paper and heated to drive off the liquids of the composition, is a surface finish coating having voids due to oil evolution, the voids having the walls thereof of protein and hardened by the cation action to minimize sensitivity to water.

My present invention relates to improvements in the production of coated papers and the like. The invention has particular relation to coated paper products in which the coating has a cellular structure.

In my copending application, United States Ser. No. 292,404 filed July 2, 1963, now U.S. Patent 3,328,184 and assigned to the same assignee as the present invention, I have described and claimed a pigmented paper coating composition of the oil-in-water type. Such composition usually has a modified starch as the essential binder component for retaining the pigment on the paper. Protein serves as an emulsifying agent in the described compositions; I have particularly noted in that application, the disclosure of which is incorporated herein by reference, that it is essential that the composition be subjected to high shear, agitation or the like to provide the oil in the form of fine droplets such that essentially all of the oil droplets have a diameter of between about 0.5 and 3.5, and usually 99% have a diameter below 2.5 microns. Such small diameter droplets, upon water and oil evaporation, form small cells which scatter visible light and provide opacity in the dried coating.

The walls of the cells in my compositions are essentially proteinaceous, being derived from the emulsifier; these walls are set in a matrix of the modified starch and pigment. Both the protein and starch materials are water sensitive and in some instances the coating is tacky to the touch. The cell walls, if they become well wetted, tend to collapse. Such characteristics do not affect the paper coating for its use in rotogravure and letterpress printing. However, both water sensitivity and tackiness to the touch (a characteristic not found by all people) are desirably minimized.

I have now found that such compositions, as I have herein broadly described and as set forth in my copending application may, in their final dried film form, be particularly benefitted as to water resistance and tackiness by the inclusion of a hardening agent for the protein. Such inclusion is made within the coating composition prior to its application to a paper web or the like.

It is additionally known that emulsions having anionic emulsifiers are commonly broken by the addition of polyvalent cations. The protein in my compositions is anionic acting in character and, accordingly, it normally would be expected that the inclusion of a polyvalent cation thereto would break the emulsion, materially increase the composition viscosity, cause flakiness in the final coating and, in effect, render the coating composition useless for its intended purpose.

Zinc ammonia complexes which have been suggested for insolubilizing protein require considerable heat to effectively break down the zinc ammonia complex so that the desired action may take place. Such heat and/or the time of heating is relatively excessive and undesirable in papermaking operations.

Surprisingly, I have now found that water-soluble agents which provide polyvalent metallic cations and which would normally find use in the breaking of emulsions having emulsifiers of anionic character, may, under certain conditions, be beneficially employed as hardening agents in conjunction with my coating compositions. It is believed that the protein is retained about the oil by forces which are such that the presence of the polyvalent metallic cation does not coagulate the protein and break the emulsion. Further, while I have found that it is desirable to have the emulsion otherwise completely formed before addition of an agent containing a cation, such is not absolutely necessary. I have successfully formed the emulsion in the presence of the cation; in one instance the oil and cationic agent were added substantially simultaneously to the other components of the composition while agitating vigorously.

It is, accordingly, a primary object of this invention to provide a process for hardening paper coating compositions of the oil-in-water starch binder type wherein protein serves as the emulsifier to separate the discontinuous oil phase from an aqueous pigment-modified starch containing continuous phase.

Another object is to provide a coating composition of the oil-in-water starch binder type wherein protein serves as the emulsifier and the composition contains a hardening agent.

Yet another object of the invention is to provide a novel surface finish coating composition for paper.

Still another object of the invention is to provide a novel process for the production of coated paper.

To achieve the procedure of invention in a satisfactory manner with pigmented emulsion coating compositions I have found that the pH must be closely controlled. A pH in the range of about 6.5 to 7.6 is commonly useful; a pH range of about 6.0 to about 7.8 may be employed. If the pH increases beyond about 7.8, pigment dispersion is facilitated but then the protein tends to become more solvated. Below about 6.0 the thickening of the composition becomes very severe. Some compositions which are useful at pH 6.5 tend to become excessively viscous if the pH is lowered to 6.0; water dilution then, while possible, of course reduces solids content.

The hardening agents which I have found to be useful are those water soluble components which commonly coagulate proteins such as polyvalent metallic cation materials. Such class includes, for example, papermaker's alum $(Al_2(SO_4)_3 \cdot 18H_2O)$ although divalent salts also serve the purpose; zinc chloride, copper sulfate and chromium chloride are examples of useful components. Some hardening agents cause a pH decrease and such agent addition preferably should not be permitted to lower the pH below about 6.5 as already noted. The hardening agent is itself apparently readily concentrated on the protein which acts to enclose the oil of the emulsion. For this purpose the starch which is the binder of the system is required to be essentially free of protein which could react with the hardening agent—otherwise thickening of the continuous aqueous phase would result. The preferred hardening agent is papermaker's alum (Al$_2$(SO$_4$)$_3$·18H$_2$O)

Preferably also, this alum is added to the extent of 5 to 30% by weight of the protein present. Aluminum chloride and the chlorides of zinc, nickel and chromium as well as copper sulfate are useful. The nickel cation appears to be the least effective while aluminum is preferred.

The starch component should be essentially non-gelling, that is, it should not gel or should provide a very soft gel. Preferably, however, and importantly, I have found that a starch cooked and oxidized simultaneously on a continuous basis in a jet cooker as described in the copending application of George E. Lauterbach, Ser. No. 116,734, filed June 13, 1961, now U.S. Patent 3,211,564, and assigned to the same assignee as the present invention, is much to be preferred. It had previously been found that when a composition was formulated in the manner described in the said application, with the components including both starch and a percentage of protein, the resultant starch occasioned less tackiness in the dried pigmented coating composition than would starch components oxidized and cooked separately including starches prepared by commercial processes. It was not, therefore, to be expected that the mere addition of alum to such a composition would further enhance this characteristic and decrease the water sensitivity nor could it have been predicted that such alum addition would not coagulate the protein emulsifying agent. Nevertheless, I have found that starch cooked and oxidized by the continuous process and termed herein for convenience "jet cooked and oxidized starch" is much to be preferred. Accordingly, in this description and in the appended claims, it will be understood that the term "jet cooked and oxidized" as applied to starch means a starch which is cooked and oxidized on a continuous basis at a temperature well above the gelatinization point of the starch and in the presence of the protein. Other starches of essentially non-gelling character such as hydroxyethylated, oxidized, and root starches may be employed but, surprisingly, the jet cooked and oxidized is superior for use with the invention. Whether "jet cooked and oxidized" or otherwise, the quantity of protein necessary to enclose the oil is essentially the same for the compositions.

It is important to the procedure that the starch binder of the composition be largely free of protein in any form in which it may react with the hardening agent. Protein in the starch binder in a form in which it may be coagulated by the hardening agent addition is detrimental as it tends to thicken the emulsion. Proteinaceous materials useful as the emulsifying agent include soy protein, casein, animal glue and soluble blood protein; low viscosity soy protein is preferable but the so-called high viscosity protein is useful. The quantity of protein optionally is only sufficient to enclose the small oil droplets and separate the phases. A substantial quantity of protein in the continuous phase would tend to precipitate and spoil the coating composition. Also, excess protein, while not harmful for rotogravure printing, does tend to lower the pick resistance of the coatings and such is detrimental for letterpress printing papers.

The invention will be more fully understood by reference to the following detailed examples and accompanying drawings wherein.

Figure 1:
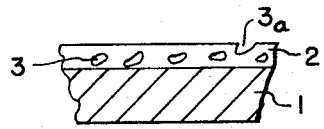
FIG. 1 is a considerably enlarged fragmentary and sectional view schematically illustrating the physical structure of a coating composition on a paper web in accordance with the invention.

Referring to the drawings, the numeral 1 in FIG. 1 designates a paper web having a cellular coating 2 thereon. Coating 2 includes a multiplicity of cells, voids or the like indicated at 3 and which are of such size that they produce significant light scattering of visible light directed to the coating; thus the opacity of the coating is high. This light scattering and opacity are attained because of reflection of light from the ruptured cells indicated at 3a and shown more clearly in FIG. 3.

Figure 2:
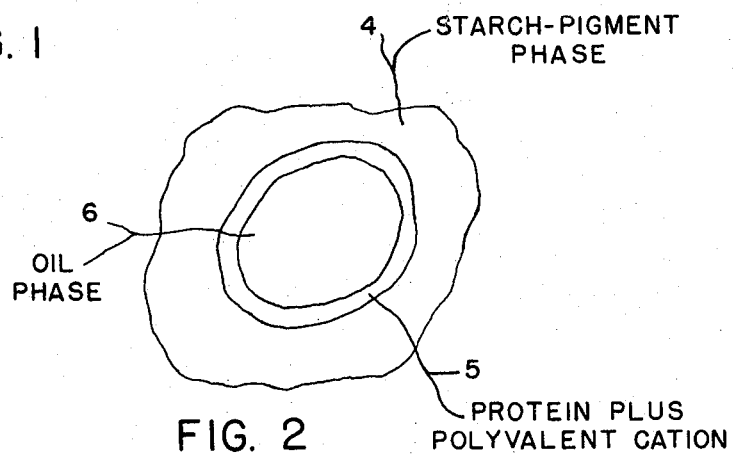
FIG. 2 is a greatly enlarged fragmentary view of an oil-containing cell of the coating composition with the surrounding aqueous continuous phase indicated.

In the present instance the cells are derived from an aqueous oil-in-water emulsion; this oil-in-water emulsion as illustrated in FIG. 2 at 4 contains pigment in the continuous phase together with modified starch as the binder; the oil phase is designated at 6 and the oil is of lower vapor pressure than water. Protein serves as the emulsifier and, as indicated in FIG. 2 by the numeral 5, the emulsifying film includes protein plus a hardening agent in the form of polyvalent cations.

Figure 3:
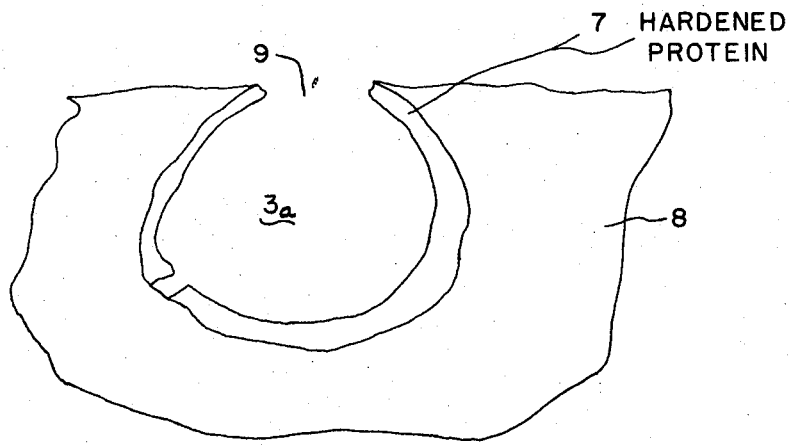
FIG. 3 is a view similar to that of FIG. 2 but illustrating the apparent cell arrangement when the water and oil have been evaporated.

Upon breaking of the emulsion and oil evaporation, the hardened protein 7 is surrounded by the starch-pigment solidified phase designated at 8 in FIG. 3 and the cell wall is itself ruptured usually in a plurality of places as indicated at 9.

*Example 1*

This example illustrates the complete preparation of a coating composition in accordance with the invention. Initially, a slurry is prepared for jet cooking as follows:

| | Parts by weight |
|---|---|
| Water | 270 |
| Clay (papermaker's coating clay) | 135 |
| Starch (pearl corn 121—10% moisture) | 121 |
| Protein (soy—7% moisture) | 14 |
| Sodium hydroxide | 1.25 |
| Soap (sodium stearate) | 1.25 |
| Ammonium persulfate | 0.5 |

The above composition was subjected to a temperature of approximately 260° F. and the composition was flowed on a continuous basis through a cooking apparatus of the jet type. Such apparatus is well known and specifically was the type of equipment set forth and described in the copending application Ser. No. 116,734 of George E. Lauterbach, referred to hereinabove. However, any jet cooker, such as the Thermutator, which is a product of Cherry-Burrell Company, Cedar Rapids, Iowa, and which is a continuous autoclave, may be employed.

The time of cooking or passage through the unit was less than one minute, and the oxidizing agent was completely consumed in the process. The composition, on emanating from the cooker, had a viscosity of about 100 centipoises at 190° F. and a pH of about 8. To the hot composition (180° F.) there was slowly added about 170 parts by weight of oil of specific gravity of 0.78 (Stoddard's solvent). The composition was agitated during oil addition. The coating was then pumped through a Kady mill to form a fine emulsion in which substantially all of the oil droplets had a diameter of between 0.5 to 2.5 microns. The rate at which the coating composition was passed through the Kaddy mill was approximately 10 gallons per minute and the shearing stress developed was approximately 2,500,000 dynes per square centimeter. Viscosity of the coating composition increased considerably during oil addition. The viscosity of the resulting composition at 50° C. as measured on a Brookfield viscometer at 100 r.p.m. with a No. 7 spindle was approximately 11,000 centipoises. Essentially all of the protein of the composition formed about the oil droplets, the continuous phase being substantially free of protein.

To this resultant pigmented oil-in-water emulsion there was then added a 5% solution of papermaker's alum, the addition being sufficient to provide one part by weight of the alum in the coating composition. This addition did not materially thicken the coating composition. The resultant composition had a percent solids of about 27.5, a viscosity of 12,600 centipoises at 50° C. as measured on a Brookfield viscometer at 100 r.p.m. with a No. 7 spindle, and the pH was about 7.1.

This coating composition was then applied to a paper base sheet having a basis weight (25" x 38" x 500 sheets) of about 25 pounds. The coating composition was applied to the paper web with a conventional blade coater, the opposite sides being coated successively. The coat weight applied per side was approximately 3 pounds so that the dried coated sheet had a basis weight of about 31 pounds. Drying of the coating took place on a continuous basis in an air blast having a temperature of about 310° F., the water evaporating primarily first and then the oil. The first coating was dried before application of coating to the second side.

*Example 2*

The foregoing Example 1 was repeated except that there was no alum addition. The coat weight on the paper sheet in this instance was slightly greater than 3 pounds per ream and the composition as applied had a pH of about 8.0. The composition was also characterized by a viscosity of about 11,000 centipoises at 50° C. as measured on the Brookfield viscometer at 100 r.p.m. with a No. 7 spindle.

A comparison of the sheets produced by Examples 1 and 2 was made by visual observation of water droplets applied to the sheet. The coated sheet of Example 2 was much more readily wetted than was the sheet of Example 1.

Attempts have also been made to lower the coating pH and secure the same benefits, for example, by addition of HCl and $H_2SO_4$. Such did not improve the condition as does the treatment of Example 1.

*Example 3*

A portion of the same jet cooked composition of Example 1 having the oil emulsified therein was subjected to an alum addition to the extent of about 2.7 parts by weight, the addition being in the form of a 10% aqueous solution. Such resulted in a material thickening of the coating and water addition was necessary to make it readily flowable for blade coating application. In this instance the percent solids was about 25.2%, and the composition demonstrated a viscosity of 30,000 centipoises. The pH was about 5.8. The coat weight applied by blade coating was approximately 2.6 pounds per side. Such composition was clearly useful although, as already indicated, a borderline situation for hardening agent addition is here indicated. The pH drop was slightly excessive, and the composition was not considered particularly useful for commercial purposes.

*Example 4*

A coating composition suitable for commercial use in the production of letterpress and rotogravure coatings for paper was made by first combining the following component at room temperature.

| | Parts by weight |
|---|---|
| Starch (hydroxyethylated, medium viscosity) | 200 |
| Casein | 20 |
| Clay | 200 |
| Water | 600 |
| Sodium hydroxide | 1 |

This composition was slurried, cooked in an open vessel at about 190° F. for 20 minutes, and oil (Stoddard's solvent) to the extent of 312 parts by weight was added to the slurry while it was at a temperature of about 175° F. An initial crude dispersion of oil in the slurry was formed by stirring with a Lightning mixer as the oil was added. The coating was then pumped to a coating room and passed through a Kady mill to form a fine emulsion. Alum was then added to the extent of about 1.5 parts by weight as a 6% solution. The resulting composition had a solids content of about 30.6%, a pH of about 7.7, and a viscosity of about 7200 centipoises as measured at 50° C. on a Brookfield viscometer at 100 r.p.m. with a No. 7 spindle. The resultant composition was applied to paper and dried similar to the product of Example 1, exhibiting good tack and water resistance.

*Example 5*

The procedure of Example 1 was repeated, except that the quantity of protein was doubled. In this instance, while the composition exhibited good resistance to water and was not particularly tacky to the touch, the composition itself was on the borderline of utility as to viscosity, probably because some of the protein was free in aqueous phase.

In connection with the foregoing disclosure it is to be noted that the composition is directly applicable to the paper with the hardening agent included and that no agent of the delay type, such as is provided by the amide of Patent 2,101,574, is required. It is further to be noted that the drying in all instances was effected in a high velocity air blast in which the air had a temperature of between about 300° and 400° F.; however, other drying procedures known to the papermaking art, such as drying on a Yankee drier, may be employed.

I regard the pH control as an important factor in the success of the system. Commonly, protein and highly alkaline systems are compatible because the protein disperses readily in aqueous alkali. But such systems tend to result in water sensitivity of the final coating.

By the term "substantially free of protein" as applied to the continuous phase of the emulsions treated in accordance with the invention, I mean that the aqueous phase is sufficiently free of protein that deleterious thickening of the composition does not occur in the presence of the hardening agent. By the term "consisting essentially of" in the definition of components herein and in the appended claims I mean those ingredients whose presence is essential and as used it is intended to exclude the presence of other materials in such amounts as to interfere substantially with the properties and characteristics possessed by the compositions set forth—but to permit the presence of other materials in such amounts as not substantially to affect said properties and characteristics adversely.

With respect to the quantity of hardening agent required, this is related to the quantity of protein, the nature of the hardening agent and the degree of hardening required. This hardening is apparently a cross-linking action and with most compositions 5 to 30% by weight of alum on the protein serves well. The protein quantity itself is related to the oil quantity employed and to the fineness of the dispersion. I prefer dispersions which 99% of the oil has, a size of less than 2.5 microns down to about 0.5 micron. The oil quantity is, of course, related to the extent of the voids desired in the final product and thus has relation to the binder quantity. Pigment is present as clay, titanium dioxide, and the like both to aid printability and drying of the coating composition.

The essential non-tackiness characteristic of the coated sheet treated with the polyvalent metallic cation is apparent as the sheet comes from the drier of the coating device. In contrast to compositions formulated without the polyvalent metallic cation, the coated webs of the present invention to the touch are substantially non-sticky.

The physical characteristics of the finish sheet as to brightness and opacity and the like are not affected significantly in either direction by the inclusion of the hardening agent.

In essence, in all instances the amount of hardening present is sufficient to harden or insolubilize the protein which surrounds the oil droplets. The protein itself must not be sufficient to be found in the aqueous phase to any significant degree as undue thickening would then occur. Under such prescribed circumstances the stability of the emulsion is the same as the stability of the emulsion when no insolubilizing agent is added. That is, the composition exhibits a life which is entirely adequate for use in commercial papermaking operations.

It will be understood that this invention is susceptible to modification in order to adapt to different usages and conditions and, accordingly, it is desired to comprehend such modifications within the invention as may fall within the scope of the appended claims.

What is claimed is:

1. A stable paper coating composition of the oil-in-water type comprising an aqueous continuous phase containing dispersed pigment and a cooked essentially non-gelling starch as binder constituent, a dispersed oil phase containing oil having a lower vapor pressure than water and in the form of droplets of about 0.5 to 3.5 micron size, a proteinaceous emulsifying agent, and a water-soluble component having polyvalent metallic cations which concentrate in the proteinaceous emulsifying agent, said composition having a pH in the range of about 6.0 to 7.8 and said aqueous continuous phase being substantially free of proteinaceous material.

2. A composition as claimed in claim 1 and in which the water-soluble component is papermaker's alum present to the extent of between about 5% to 30% by weight of the proteinaceous emulsifying agent.

3. A stable paper coating composition of the oil-in-water type consisting essentially of an aqueous continuous phase containing dispersed pigment and jet cooked and oxidized starch as binder constituent, a dispersed oil phase containing oil having a lower vapor pressure than water and in the form of droplets of about 0.5 to 2.5 micron size, a proteinaceous emulsifying agent, and added thereto a water-soluble component having polyvalent metallic cations which concentrate in the proteinaceous emulsifying agent, said composition having a pH in the range of about 6.0 to 7.8 and said water-soluble component being papermaker's alum present to the extent of between about 5 and 30% by weight of the proteinaceous emulsifying agent, the said aqueous continuous phase being substantially free of proteinaceous material.

4. In the production of a paper coating composition which is applied to paper in the form of an oil-in-water emulsion having in the continuous aqueous phase pigment and non-gelling starch as binder and in the discontinuous phase oil in the form of droplets of 0.5 to 2.5 micron size and of a lower vapor pressure than water with a proteinaceous component as an emulsifier separating the phases, said aqueous phase being substantially free of proteinaceous material, the step of addition of a water-soluble agent containing a polyvalent metallic cation which concentrates in the proteinaceous component and is effective to harden the proteinaceous component and which composition after water-soluble agent addition has a pH in the range of about 6.0 to about 7.8.

5. In the production of a paper coating composition having a pH in the range of 6.5 to 7.6 and in the form of an oil-in-water emulsion having in the continuous aqueous phase pigment and modified starch as binder and in the discontinuous phase oil in the form of droplets of 0.5 to 2.5 micron size and of a lower vapor pressure than water with a proteinaceous component as an emulsifier separating the phases, said aqueous phase being substantially free of proteinaceous material, the step after emulsion formulation of addition of a water-soluble agent containing a polyvalent metallic cation which concentrates in the proteinaceous component and is effective to harden the proteinaceous component without breaking of the emulsion and after which water-soluble agent addition the pH of the composition is in the said range of 6.5 to 7.6.

6. In the production of pigmented coated paper having a cellular structure and modified starch as the essential binder constituent, the steps of:

(a) applying to a paper web a coating composition having a pH in the range of about 6.0 to about 7.8 and which is an oil-in-water emulsion, said emulsion having in the continuous aqueous phase dispersed pigment and dispersed cooked non-gelling starch, said emulsion having in the discontinuous phase an oil of lower vapor pressure than water, and protein as emulsifying agent separating the phases, the said aqueous phase being substantially free of the said emulsifying agent, the emulsifying agent having included therein as hardening agent a polyvalent metallic cation component derived from a water-soluble salt and which concentrates in the protein emulsifying agent, (b) heating the paper web with the coating composition thereon to break the emulsion, (c) and evaporating the water and oil by the heating step to dry the composition and produce in the modified starch binder-pigmented coating cells in which protein hardened by the polyvalent cation coats the walls of the cells.

References Cited

UNITED STATES PATENTS

| | | | |
|---|---|---|---|
| 1,871,842 | 8/1932 | Dile | 117—156 |
| 2,101,574 | 12/1937 | Dangelmajer | 117—156 |
| 3,108,009 | 10/1963 | Clancy et al. | 117—156 |
| 3,157,533 | 11/1964 | Clancy et al. | 117—156 |
| 3,166,466 | 1/1965 | Puydak | 117—156 |
| 3,242,028 | 3/1966 | Hart | 117—156 |

MURRAY KATZ, *Primary Examiner.*